P. Williams. Cotton Press.

4327 R. A. Williams. J. L. Williams. } Assignees.

REISSUED APR 4 1871

Witnesses
S. W. Tool
R. H. Whittlesey

P. Williams
by Wm. H. Clem
Atty

United States Patent Office.

PAUL WILLIAMS, OF WINONA, MISSISSIPPI, ASSIGNOR TO ROBERT A. WILLIAMS AND JAMES L. WILLIAMS,

Letters Patent No. 73,683, dated January 21, 1868; reissue No. 4,327, dated April, 4, 1871.

IMPROVEMENT IN COTTON-PRESSES.

The Schedule referred to in these Letters Patent and making part of the same.

*To all whom it may concern:*

Be it known that I, PAUL WILLIAMS, of Winona, in the county of Carroll and State of Mississippi, have invented a new and useful Improvement in Cotton-Presses; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
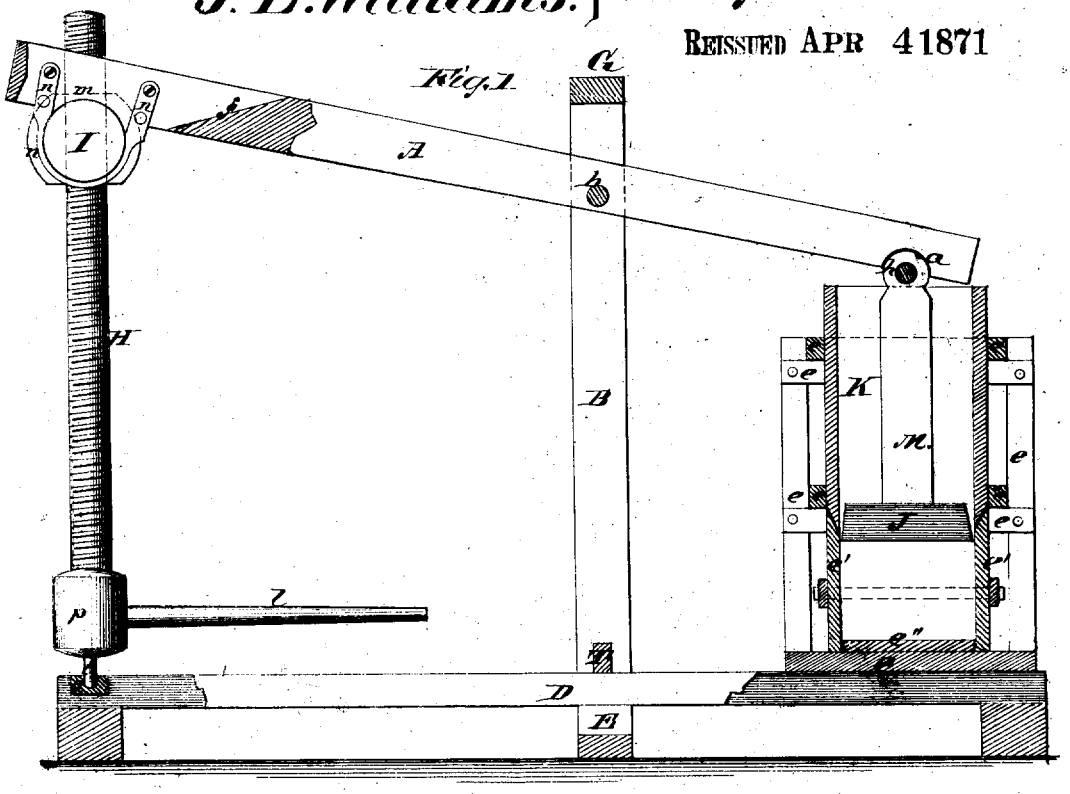
Figure 1 is a side elevation of my press with certain removed sections for the better exhibition of its parts.
Figure 2:
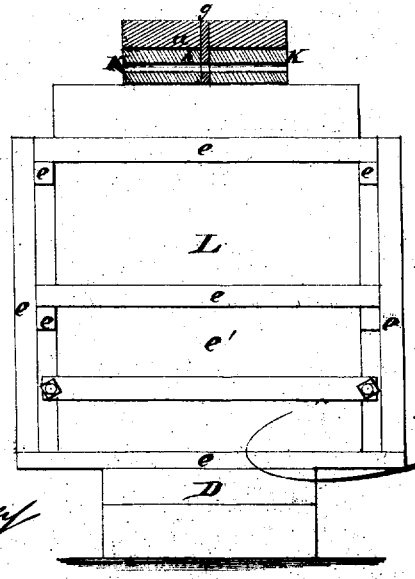
Figure 2 is a front elevation of the same with a cross-section of the lever-head.

This invention relates to an improvement in cotton-presses, and consists of the combination of a lever having a long and short arm, with a vertical screw to actuate the same, whereby the follow-block receives its motion from the shorter arm of said lever, and is forced down with great power.

Other devices perfecting the whole render this press more simple than, and equally effective with, any cotton-press heretofore known or used.

In the drawing—

A is the lever-beam, pivoted to one or two uprights, B, of suitable kind, said uprights being secured to the bed D of the press or otherwise held in position by suitable means.

The fulcrum of the lever A rests in the upright or uprights B, and is so applied to the beam A as to form a long and a short arm on the same.

At that end of the bed immediately under the end of the longer arm of the lever-beam is a metallic step-bearing, *d*, which receives the gudgeon *i* on the base of the screw H, as shown.

This step is simply a hemispherical indentation, which will permit a slight deviation of the screw from the perpendicular without cramping the gudgeon *i*.

This screw actuates the lever-beam by means of a partially-revolving tap, I, which is held in and against a circular recess, *m*, in the lever-beam by circular iron straps *n*, embracing the tap and bolted to the lever-beam, as shown.

The object of this partially-revolving tap is to permit the vibration of the lever and screw as the press is operated, and without which device, or its equivalent, the screw could not be applied directly to the lever to actuate it up or down.

The screw, after passing the tap, passes through a mortise in the beam, and the front end *f* of said mortise is beveled for the purpose of permitting the lever-beam to assume the proper angle of inclination when its long arm is depressed to elevate the follow block J within the box K containing the cotton.

The said box K is made in the ordinary or similar manner, having vertical planks L arranged within and secured to a stout frame-work, *e*, as shown. This box rests on the bed-sills, under the front end of the short arm of the lever-beam, at such a distance from the centre line of the pivot-bolt *b* that the thrust-beam M attached to the follow-block will be quite or nearly vertical when the long arm of the lever-beam is elevated to its highest point, as shown in the figure. The bale will then be compressed sufficiently to be removed from the press after the bale has been roped in the usual manner.

The thrust-beam M is made with a circular head, *h*, which fits in and against a circular recess, *a*, in the lever-beam.

When the cotton is being compressed this head and recess partake of the strain due to the resistance of the cotton; but when the follow-block is to be withdrawn after the bale has been pressed and roped a plate, *g*, and bolt *k*, forming a hinge device, as shown, take the strain, which strain is simply the weight of the follow-block and thrust-beam.

An arm, *l*, set into a hole in the base *p* of the screw, serves to apply the power for operating the press.

The lower part of the box K is removable in the ordinary manner, being composed of the sides *e'* and similar ends, not shown in the drawing, all of which are held against the bottom *e''* and beveled joints of the planking *e* of the upper part of the box, thus forming a continuation of the same, as shown.

To employ this press, the handle *l* is turned till follow-block J is raised clear of the box. It will then swing more or less clear of the open top of the same.

Cotton in sufficient quantity for a bale of the ordinary size is placed in the box, and the follower-block swung back over the opening. The handle *l* is then turned to press the cotton.

When the follow-block has got the position shown in the drawing the removable sides and ends are taken away and the bale roped in the usual way.

By hanging the lever-beam by a bolt to a tree the bed D and uprights may be dispensed with, for a large block resting on the ground will serve to sustain the thrust of the screw H, and the box K, with its general frame *e*, can rest directly upon the ground.

Thus the press will be made still more simple and quite as effective.

The advantages of this press consist, chiefly, in its simplicity, durability, and cheapness, together with the important feature that it can be worked by levers in pressing cotton, and is the simplest hand-press for that purpose that has been heretofore used.

I am aware that cotton-presses operated by levers or screws are in daily use, but these are employed in combination with other mechanism, and all are more or less complicated. I therefore do not claim, broadly, a screw or lever as part of my press; but having thus described my invention,

I claim as new and desire to secure by Letters Patent—

1. Combining the lever-beam A with the screw H, follower J, and thrust-beam M, to form a cotton-press, substantially as shown and described.

2. The partially-revolving tap I, combined with its recess *m* and the screw H and lever-beam A of a cotton-press, substantially as shown and described, and for the purpose specified.

PAUL WILLIAMS.

Witnesses:
E. HUNTLEY,
C. G. BRADLEY